US007944774B2

(12) United States Patent
Monk et al.

(10) Patent No.: US 7,944,774 B2
(45) Date of Patent: May 17, 2011

(54) METHOD FOR DETERMINING ADEQUACY OF SEISMIC DATA COVERAGE OF A SUBSURFACE AREA BEING SURVEYED AND ITS APPLICATION TO SELECTING SENSOR ARRAY GEOMETRY

(75) Inventors: David Monk, Sugar Land, TX (US); Paul G Young, Perth (AU)

(73) Assignee: Apache Corporation, Houston, TX (US)

( * ) Notice: Subject to any disclaimer, the term of this patent is extended or adjusted under 35 U.S.C. 154(b) by 140 days.

(21) Appl. No.: 12/409,577

(22) Filed: Mar. 24, 2009

(65) Prior Publication Data
US 2009/0279388 A1 Nov. 12, 2009

Related U.S. Application Data

(63) Continuation-in-part of application No. 12/116,373, filed on May 7, 2008.

(51) Int. Cl.
*G01V 1/20* (2006.01)
*G01V 1/28* (2006.01)

(52) U.S. Cl. ............... 367/21; 367/15; 367/16; 367/19; 367/20; 703/18; 181/101

(58) Field of Classification Search .................... 367/14, 367/20, 21, 38, 47, 48, 50, 62, 63; 702/11
See application file for complete search history.

(56) References Cited

U.S. PATENT DOCUMENTS

| | | | | |
|---|---|---|---|---|
| 4,467,459 A * | 8/1984 | Currie | ............................. | 367/21 |
| 4,481,611 A * | 11/1984 | Burrage | ........................... | 367/19 |
| 5,717,655 A * | 2/1998 | Beasley | .......................... | 367/53 |
| 6,144,342 A * | 11/2000 | Bertheas et al. | ............. | 343/709 |
| 6,343,256 B1 | 1/2002 | Winbow et al. | | |
| 6,691,075 B1 * | 2/2004 | Winbow et al. | .................... | 703/2 |
| 6,763,305 B2 * | 7/2004 | Bernitsas | ........................ | 702/14 |
| 6,826,484 B2 * | 11/2004 | Martinez et al. | ................ | 702/14 |
| 6,932,017 B1 * | 8/2005 | Hillesund et al. | ............. | 114/244 |
| 7,027,927 B2 * | 4/2006 | Matsuoka et al. | .............. | 702/11 |
| 7,080,607 B2 * | 7/2006 | Hillesund et al. | ............. | 114/244 |
| 7,162,967 B2 * | 1/2007 | Hillesund et al. | ............. | 114/344 |
| 7,336,560 B2 * | 2/2008 | Rekdal et al. | .................... | 367/15 |
| 7,376,045 B2 * | 5/2008 | Falkenberg et al. | ............ | 367/19 |
| 2004/0054477 A1 | 3/2004 | Bernitsas | | |
| 2004/0215396 A1 * | 10/2004 | Christie et al. | .................. | 702/14 |

OTHER PUBLICATIONS

O. E., Naess: "Repeatability and 4D seismic acquisition," SEG, Annual Meeting, 2006 pp. 3300-3304.

(Continued)

*Primary Examiner* — Jack Keith
*Assistant Examiner* — Daniel L Murphy
(74) *Attorney, Agent, or Firm* — Richard A. Fagin; Adenike Adebiyi

(57) ABSTRACT

A method for marine seismic surveying includes towing seismic sensors in a plurality of streamers in the water, actuating a seismic energy source in the water at selected times and detecting seismic signals at the sensors resulting from the actuation of the source. A data trace is created for each of the detected signals. At least one Fresnel zone is determined for at least some of the seismic data traces. A contribution of each of the traces to each one of a plurality of bins defined in a predetermined pattern is computed, based on the Fresnel zone associated with each trace. Based on the computed contributions, a maximum lateral distance between corresponding seismic sensors is determined that will result in a contribution sum above a selected threshold.

12 Claims, 8 Drawing Sheets

OTHER PUBLICATIONS

A. Görtz, P. Milligan, M. Karrenbach, B. Paulsson: "Optimized 3D VSP survey geometry based on Fresnel zone estimates," SEG, Annual Meeting, 2005, pp. 2641-2645.

V. Červený, J. E. P. Soares: "Fresnel volume ray tracing," Geophysics, vol. 57, No. 7, 1992, pp. 902-915.

D. J. Monk: "Fresnel zone binning: Application to 3D seismic fold and coverage assessments," The Leading Edge, Mar. 2009, pp. 288-295.

D. J. Monk: "Fresnel zone binning: Fresnel-zone shape with offset and velocity function," Geophysics, vol. 75, No. 1, Feb. 2, 2010, pp. T9-T14.

Notification of Transmittal of the International Search Report and the Written Opinion of the International Searching Authority of Sep. 28, 2010 in International Application No. PCT/US2009/040505.

* cited by examiner

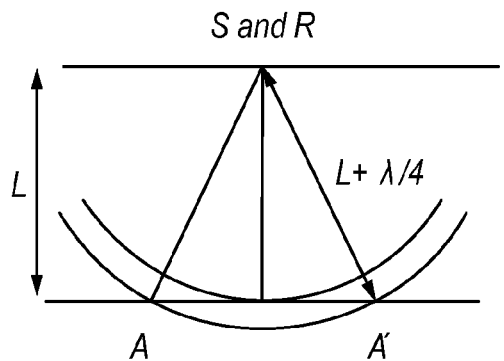
*FIG. 4A*
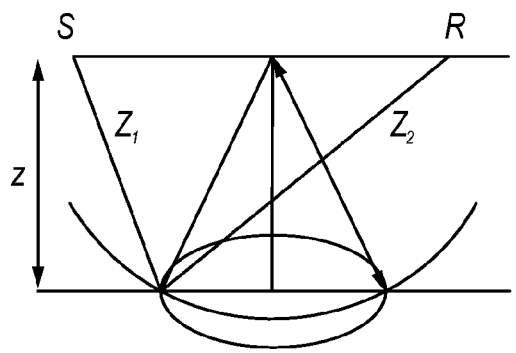
*FIG. 4B*
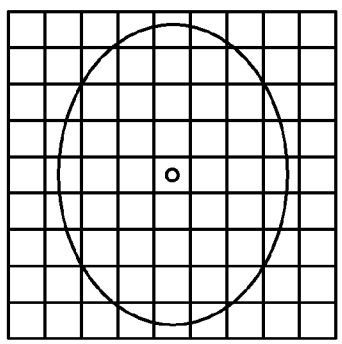
*FIG. 5A*
*(Prior Art)*
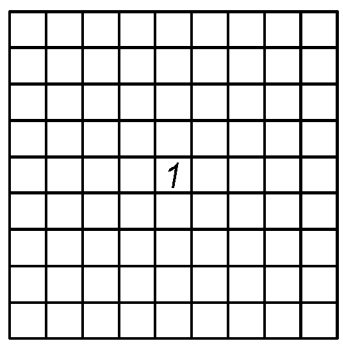
*FIG. 5B*
*(Prior Art)*
*FIG. 5C*

METHOD FOR DETERMINING ADEQUACY OF SEISMIC DATA COVERAGE OF A SUBSURFACE AREA BEING SURVEYED AND ITS APPLICATION TO SELECTING SENSOR ARRAY GEOMETRY

CROSS-REFERENCE TO RELATED APPLICATIONS

Continuation in part of U.S. patent application Ser. No. 12/116,373 filed on May 7, 2008.

STATEMENT REGARDING FEDERALLY SPONSORED RESEARCH OR DEVELOPMENT

Not applicable.

BACKGROUND OF THE INVENTION

1. Field of the Invention

The invention relates generally to the field of seismic surveying of the Earth's subsurface. More specifically, the invention relates to methods for determining whether seismic data have been acquired to sufficient spatial density to avoid distortions in generating images of the Earth's subsurface from seismic data.

2. Background Art

In seismic surveying, seismic energy sources are used to generate a seismic signal that propagates into the earth and is at least partially reflected by subsurface seismic reflectors. Such seismic reflectors typically are located at the interfaces between subterranean formations having different acoustic properties, specifically differences in acoustic impedance at the interfaces. The reflections are detected by seismic receivers at or near the surface of the earth, in an overlying body of water, or at known depths in boreholes. The resulting seismic data may be processed to yield information relating to the geologic structure and properties of the subterranean formations and their potential hydrocarbon content.

A purpose for various types of seismic data processing is to extract from the data as much information as possible regarding the subterranean formations. In order for the processed seismic data to accurately represent geologic subsurface properties, the reflection amplitudes need to be represented accurately. Non-geologic effects can cause the measured seismic amplitudes to deviate from the amplitude caused by the reflection from the geologic target. Amplitude distortions resulting from irregular distribution of source and receiver positions during data acquisition is a particularly troublesome non-geologic effect. If uncorrected, these non-geologic effects can distort the seismic image and obscure the geologic picture.

A seismic energy source generates an acoustic wave that reflects from or "illuminates" a portion of reflectors at different depths in the subsurface. In a three-dimensional (3D) survey, seismic signals are generated at a large number of source locations, detected at a large number of receiver locations and the survey generally illuminates large areas of the reflectors. U.S. Pat. No. 7,336,560 issued to Rekdal et al. describes certain data density issues concerning marine seismic data. According to the Rekdal et al. '560 patent, processing techniques known in the art including prestack 3D migration algorithms can produce good images of the sub-surface horizons only if the surface distribution of sources and receivers is relatively uniform. In practice, there are typically irregularities in the distribution of sources and receivers. Obtaining perfectly regular acquisition geometry is typically impracticable. Consequently, according to the Rekdal et al. '560 patent, prestack 3D migrated seismic images often include non-geologic artifacts. Such artifacts can interfere with the interpretation of the seismic image and attribute maps.

In marine seismic surveying, one or more sensor cables called streamers is towed by a survey vessel near the surface of a body of water. A seismic energy source such as an air gun or air gun array is actuated at selected times. It is well known in the art that in marine seismic surveys, the streamers generally do not form straight lines behind the survey vessel. Typically marine currents and other factors such as propeller wash from the survey vessel cause the streamers to be displaced laterally, a phenomenon called "feathering." Changes in marine currents often cause changes in the feathering. In such circumstances, if the planned sail line (direction of motion) separation of the seismic vessel is maintained, then feathering will lead to coverage "holes" at some offsets or offset ranges. The term "coverage hole" as used in the Rekdal et al. '560 patent refers to a surface area where, for a given offset (source to sensor distance) or offset range, there are believed to be inadequately spatially sampled data recorded. Data are typically defined to be "located" at the surface midpoint positions between the seismic source position and the seismic sensor position at the time of acquisition of a seismic signal recording. Such coverage holes can vary in size, irregularity, and density of data remaining in the hole. It is possible to have holes where no data are present. Coverage holes may be of several kilometers extension in the sail line (inline) direction where streamers have feathered in the same direction for a long continuous length of the intended sail line, but are generally smaller in the crossline direction (orthogonal to the sail line), as this width is governed by the amount of feathering of the streamers.

In marine seismic streamer surveys, if data density criteria known in the art are used, portions of the subsurface may be believed to be inadequately covered with seismic data recordings due to streamer feathering and other causes. Thus, using such prior art seismic data density evaluation criteria, it may be believed that additional passes of the seismic vessel and streamers through the prospect survey area are required. Additional "sail-lines" (passes of the vessel and streamers through the survey area) were also thought to be needed by reason of steering the vessel to achieve acceptable coverage. That means that the lateral distance between streamer positions in all the passes made by the vessel can be on average less than in the original acquisition plan. These additional passes significantly increase the time and associated cost to complete a survey. These additional passes of the survey vessel are referred to as "infill shooting" or just "infill." A large portion of marine seismic data acquisition in a particular survey area can be infill shooting because of perceived inadequacy of data density. The infill shooting may take up to several weeks or even months to complete. Thus, it is not uncommon to spend 15-30% of total acquisition costs on infill acquisition.

According to the Rekdal et al. '560 patent, the maximum data hole sizes that will provide acceptable subsurface coverage are typically determined prior to acquisition, and are typically independent of local factors such as geology and survey objectives. Criteria for a seismic survey, such as acceptable subsurface coverage, are commonly called "infill specifications." An object of the method described in the Rekdal et al. '560 patent is to determine whether the coverage holes are of sufficient size so as to require infill acquisition.

The method disclosed in the Rekdal et al. '560 patent, as one example, makes use of certain assumptions about the required degree of data coverage based in part on substantially discontinued seismic data processing procedures. Such procedures, for example, consisted of "binning" the acquired seismic data, summing or "stacking" seismic data within each bin, and then "migrating" the data after stacking. The requirements for migration in such processing are that each of the stacked traces reasonably represents the same sum of a set of offset traces at each location. In order for the stacked trace to have similar properties at each location associated with a bin, it is important that the stacked trace be the sum of a set of similar "offset" (distance between the seismic source and receiver) traces.

To ensure such similarity, traces are summed over a small area (a "bin") such that a contribution from each of the expected offset traces is present in the sum. There are several problems with such procedure. First, the traces are summed over an area. Even if normal moveout ("NMO") has been correctly performed, in the presence of reflective horizon "dip" (change in depth with respect to position), the reflective event times will not be aligned. This is often referred to as "bin smear", and results in the loss of high frequency data content for dipping reflective events. Second, if a trace at a particular offset is missing, then either new data should be acquired (infill data), or the bin can be expanded (overlapped into adjacent areas) to see whether a suitable trace is available. Such bin "flexing" obviously increases the "bin smear", but if only a small number of traces are used, this may not be a large problem. If an acceptable trace is found, then it is copied into the required bin and may therefore now contribute to more than one stacked trace.

Some bins may contain more than one trace of the required offset. In order to keep the stack trace balance similar at all bin locations, extra traces in any such bin are not used. There are several criteria for which trace of a plurality of traces in a bin should be used, but most commonly the trace that is selected is the one having a position closest to the position of the bin center, as this potentially reduces the bin smear. However, such procedure means that some of the traces that have been acquired may be discarded from further processing.

It is currently common in seismic data acquisition, as explained above with reference to the Rekdal et al. '560 patent, to make decisions on whether infill data should be acquired based on an evaluation of what traces fall in each bin of the survey. A procedure known as "flex binning" may be performed (typically in real time during acquisition) to infill "holes" where some offsets are missing from certain bins. However, it is uncommon to "flex" more than a small distance either side of the nominal bin location because of the bin smear that would be associated with collecting traces from further away, and such "flexing" is usually based on a rectangular bin criteria.

It is known in the art to perform migration on seismic data prior to stacking. See, for example, U.S. Pat. No. 6,826,484 issued to Martinez et al. In a prestack migration sequence, each trace to be processed is migrated using its actual location (not the average of a stack set, or a theoretical bin center). Trace locations may be output from the migration stage at any selected location, and such locations are generally positioned on a grid which is associated with bin centers. The output traces can then be stacked. Despite the change in processing methodology from post stack migration, the traces selected for processing and the methods of infill selection used in the industry have remained essentially the same.

The assumptions concerning data coverage as explained above have caused the development of marine seismic survey techniques in which is it is desirable to maintain the geometry of the streamers as closely as possible in a straight line, parallel pattern behind the survey or towing vessel. There are devices known in the art for steering seismic streamers, and methods for using such devices have been developed that have as an objective the arrangement of streamers in such straight, parallel patterns despite factors such as propeller wash from the survey vessel and cross currents in the water (transverse to the direction of motion of the survey vessel). See, for example, U.S. Pat. Nos. 6,932,017, 7,080,607 and 7,162,967 issued to Hillesund et al. with reference to streamer steering methods and systems. An example streamer steering device is described in U.S. Pat. No. 6,144,342 issued to Bertheas et al.

There continues to be a need for marine seismic acquisition techniques that reduce the amount of infill coverage and increase overall survey efficiency.

SUMMARY OF THE INVENTION

A method for marine seismic surveying according to one aspect of the invention includes towing a plurality of seismic sensors in a body of water. The sensors are disposed in a plurality of laterally spaced apart streamers. A seismic energy source in the body of water is actuated at selected times, and seismic signals are detected at the sensors resulting from the actuation of the seismic energy source. A data trace is created for each of the detected signals. At least one Fresnel zone is determined for at least some of the seismic data traces. A contribution of each of the traces to each one of a plurality of output location bins defined in a predetermined pattern is computed, based on the Fresnel zone associated with each trace. Based on the computed contributions, a maximum lateral distance between corresponding seismic sensors is determined that will result in a contribution sum above a selected threshold in each bin.

In one example, the maximum distance is used to operate streamer steering devices so that the distance is maintained along each streamer.

Other aspects and advantages of the invention will be apparent from the following description and the appended claims.

BRIEF DESCRIPTION OF THE DRAWINGS

FIG. 4A shows an explanation of determining the size of a Fresnel zone where a seismic source and a seismic receiver are collocated.

FIG. 4B shows an explanation of determining a Fresnel zone where the source and receiver are offset from each other.

FIGS. 5A through 5E illustrate binning seismic data by individual traces, with an overlay of a Fresnel zone (FIGS. 5A and 5C) for comparison.

FIGS. 6A and 6B illustrate binning seismic data by contribution of multiple traces each having a determinable Fresnel zone.

DETAILED DESCRIPTION

Figure 1:
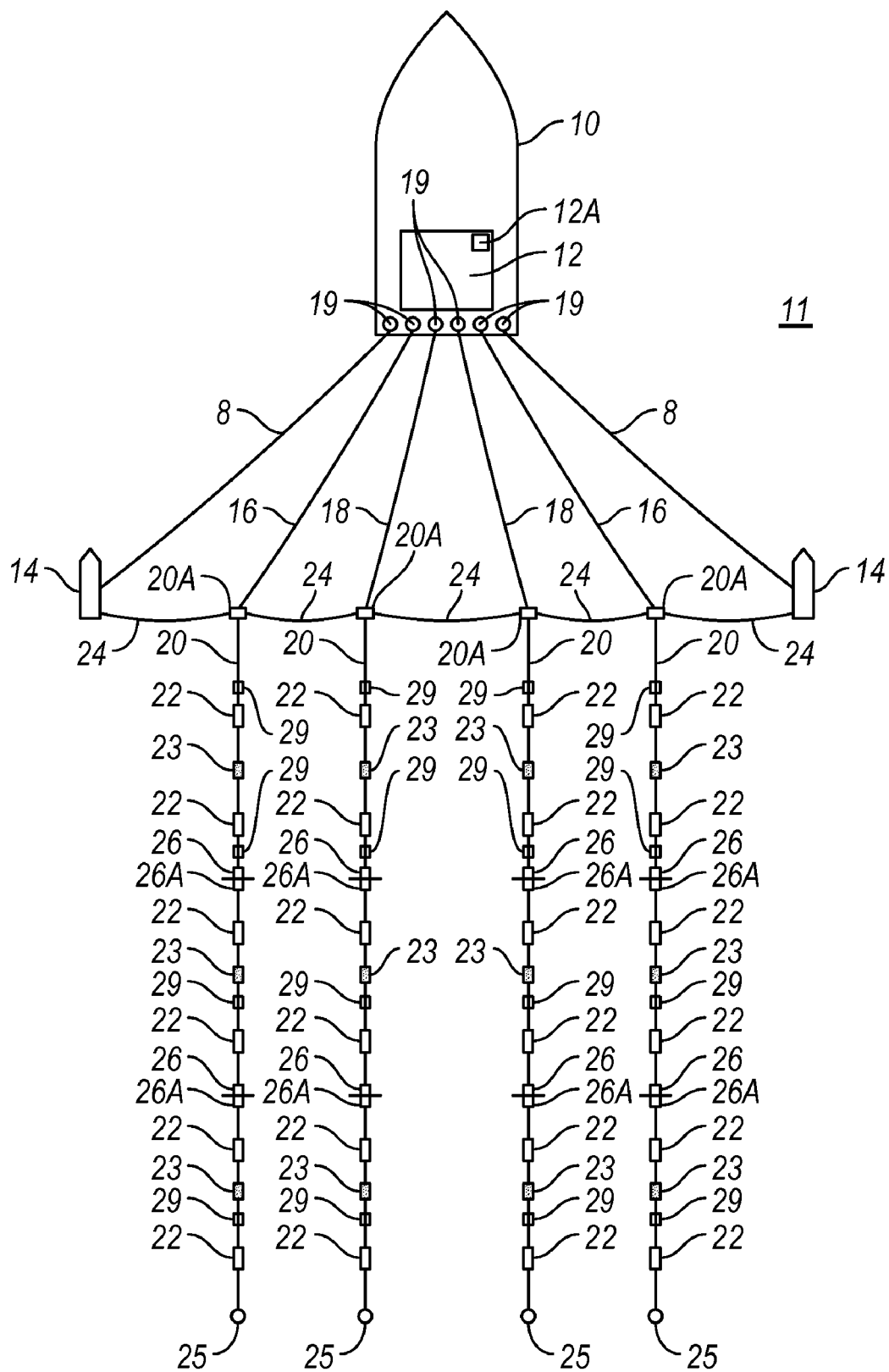
FIG. 1 shows a plan view of an example of acquisition of marine seismic data.

FIG. 1 shows a typical marine seismic survey system that can be used with various aspects of the present invention. The seismic survey system can include a survey vessel 10 that moves along the surface of a body of water 11 such as a lake or the ocean. The survey vessel 10 may include thereon electronic equipment, shown generally at 12 and for convenience collectively referred to as a "recording system." The recording system 12 typically includes devices such as a data recording unit (not shown separately) for making a record with respect to time of signals generated by various sensors in the acquisition system. The recording system 12 also typically includes navigation equipment (not shown separately) to determine and record, at selected times, the geodetic position of the vessel 10, and using other devices to be explained below, each of a plurality of seismic sensors 22 disposed at spaced apart locations on streamers 20 towed by the survey vessel 10.

A device for determining the geodetic position of the survey vessel 10 such as a global positioning satellite ("GPS") receiver, shown schematically at 12A, may be disposed on the survey vessel 10. Other geodetic position determination devices are known in the art. The foregoing elements of the recording system 12 are familiar to those skilled in the art, and with the exception of the geodetic position detecting receiver 12A, are not shown separately in the figures herein for clarity of the illustration.

The seismic sensors 22 can be any type of seismic sensor known in the art. Non-limiting examples of such sensors may include particle motion-responsive seismic sensors such as geophones and accelerometers, pressure-responsive seismic sensors and pressure time gradient-responsive seismic sensors, or combinations of the foregoing. The seismic sensors 22 may measure, for example, seismic energy primarily reflected from or refracted by various structures in the Earth's subsurface below the bottom of the water 11 in response to energy imparted into the subsurface by a seismic energy source 17 or an array of such sources, deployed in the water 11 and towed by the survey vessel 10 or by another vessel. The recording system 12 may also include energy source control equipment (not shown separately) for selectively operating the seismic energy source 17.

In the survey system shown in FIG. 1, there are four streamers 20 towed by the survey vessel 10. The number of sensor streamers shown in FIG. 1, however, is only for purposes of explaining the invention and is not a limitation on the number of streamers that may be used in any particular seismic survey system according to the invention. In marine geophysical acquisition systems such as shown in FIG. 1 that include a plurality of laterally spaced apart streamers, the streamers 20 are typically coupled to towing equipment that secures the forward end of each of the streamers 20 at a selected lateral position with respect to adjacent streamers and with respect to the seismic vessel 10. As shown in FIG. 1, such towing equipment can include two paravane tow ropes 8 each coupled to the vessel 10 at one end through a winch 19 or similar spooling device that enables changing the deployed length of each paravane tow rope 8. The distal end of each paravane tow rope 8 is functionally coupled to a paravane 14. The paravanes 14 are each shaped to provide a lateral component of motion to the various towing components deployed in the water 11 when the paravanes 14 are moved through the water 11. "Lateral" in the present context means transverse to the direction of motion of the survey vessel 10 in the water 11. The lateral motion component of each paravane 14 is opposed to that of the other paravane 14. The combined lateral motion component of the paravanes 14 separates the paravanes 14 from each other until they put into tension one or more spreader ropes or cables 24, functionally coupled end to end between the paravanes 14.

The sensor streamers 20 can each be coupled, at the axial end thereof nearest the vessel 10 (the "forward end"), to a respective lead-in cable termination 20A. The lead-in cable terminations 20A can be coupled to or associated with the spreader ropes or cables 24 so as to fix the lateral positions of the streamers 20 with respect to each other and with respect to the centerline of the vessel 10. Electrical and/or optical connection between the appropriate components in the recording system 12 and, ultimately, the geophysical sensors 22 (and/or other circuitry) in the ones of the streamers 20 inward of the lateral edges of the system may be made using inner lead-in cables 18, each of which terminates in a respective lead-in cable termination 20A. A lead-in termination 20A is disposed at the forward end of each streamer 20. Corresponding electrical and/or optical connection between the appropriate components of the recording unit 12 and the sensors 22 in the laterally outermost streamers 20 may be made through respective lead-in terminations 20A, using outermost lead-in cables 16. Each of the inner lead-in cables 18 and outermost lead-in cables 16 may be deployed by a respective winch 19 or similar spooling device such that the deployed length of each cable 16, 18 can be changed. The type of towing equipment coupled to the forward end of each streamer shown in FIG. 1 is only intended to illustrate a type of equipment that can tow an array of laterally spaced apart streamers in the water 11. Other towing structures may be used in other examples of geophysical acquisition system according to the invention.

The acquisition system shown in FIG. 1 can also include a plurality of lateral force and depth ("LFD") control devices 26 cooperatively engaged with each of the streamers 20 at selected positions along each streamer 20. Each LFD control device 26 can include one or more rotatable control surfaces (not shown separately) that when moved to a selected rotary orientation with respect to the direction of movement of such surfaces through the water 11 creates a hydrodynamic lift in a selected direction to urge the streamer 20 in any selected direction upward or downward in the water 11 or laterally along the water surface with respect to the direction of motion of the vessel 10. Thus, such LFD control devices 26 can be used to maintain the streamers in a selected geometric arrangement. A non-limiting example of the LFD devices is described in U.S. Pat. No. 6,144,342 issued to Bertheas et al. The particular configuration of the LFD devices 26, however, is not a limit on the scope of the present invention. As previously explained, for purposes of the present invention it is only necessary for any devices used as are the LFD devices 26 to be able to apply a selectable lateral force to the associated streamers 20 to put the streamers in a selected geometry behind the survey vessel 10. Depth control of the streamers 20 may be provided passively, such as by providing the streamers 20 with a selected overall specific gravity, or by separate depth control devices (not shown). Therefore, any reference to "depth" control as provided by the LFD devices 26 is only intended to cover the present example implementation, such as using the device shown in the Bertheas et al. patent referred to above.

In the present example, each LFD device 26 may include an associated relative position determination device. In one example, the relative position determination device may be an acoustic range sensing device ("ARD") 26A. Such ARDs typically include an ultrasonic transceiver or transmitter and electronic circuitry configured to cause the transceiver to emit pulses of acoustic energy. Travel time of the acoustic energy between a transmitter and a receiver disposed at a spaced apart position such as along the same streamer and/or on a different streamer, is related to the distance between the transmitter and a receiver, and the acoustic velocity of the water.

The acoustic velocity can be assumed substantially not to change during a survey, or it can be measured by a device such as a water velocity test cell. Alternatively or additionally, acoustic range sensing devices ("ARDs") may be disposed at selected positions along each one of the streamers not collocated with the LFD devices 26. Such additional ARDs are shown at 23 in FIG. 1. Each of the ARDs 26A, 23 may be in signal communication with the recording system 12 such that at any moment in time the distance between any two ARDs 26A, 23 on any of the streamers 20 is determinable. One or more ARDs may be placed at selected positions proximate the aft end of the vessel 10 so that relative distances between the selected positions on the vessel 10 and any of the ARDs on the streamers may also be determined. A non-limiting example of an ARD and system used with such ARDs is described in U.S. Pat. No. 7,376,045 issued to Falkenberg et al. Other devices for determining relative positions of the streamers are described in U.S. Pat. Nos. 6,932,017, 7,080,607 and 7,162,967 issued to Hillesund et al.

The streamers 20 may additionally or alternatively include a plurality of heading sensors 29 disposed at spaced apart positions along each streamer 20. The heading sensors 29 may be geomagnetic direction sensors such as magnetic compass devices affixed to the exterior of the streamer 20. One type of compass device is described in U.S. Pat. No. 4,481,611 issued to Burrage and incorporated herein by reference. The heading sensors 29 provide a signal indicative of the geomagnetic heading (direction with respect to magnetic north) of the streamer 20 at the axial position of the heading sensor 29 along the respective streamer 20. Measurements of such heading at spaced apart locations along each streamer may be used to interpolate the geometry (spatial distribution) of each streamer 20.

Each streamer 20 may include at the distal end thereof a tail buoy 25. The tail buoy 25 may include, among other sensing devices, a geodetic position signal receiver (not shown separately) such as a GPS receiver that can determine the geodetic position of each tail buoy 25. The geodetic position receiver (not shown) in each tail buoy 25 may be in signal communication with the recording system 12.

By determining the distance between ARDs 26A, 23, including the one or more ARDs on the vessel 10, and/or by interpolating the spatial distribution of the streamers from the heading sensor 29 measurements, an estimate of the geometry of each streamer 20 may be made. Collectively, the geometry of the streamers 20 may be referred to as the "array geometry." For purposes of defining the scope of the present invention, the various position measurement components described above, including those from the heading sensors 29, from the ARDs 26A, 23, and, if used, from the additional geodetic position receivers 25A in the tail buoys 25, may be used individually or in any combination. It is only necessary for purposes of the present invention to be able to reasonably estimate the relative position of each point along each streamer 20 with reference to the survey vessel 10. By appropriate selection of the positions along each streamer at which the various relative position measurement devices described above are disposed, it is possible to determine the array geometry without the need to measure, estimate or otherwise determine the absolute geodetic position at large numbers of positions along each streamer, such as by using a large number of GPS receivers.

Figure 2:
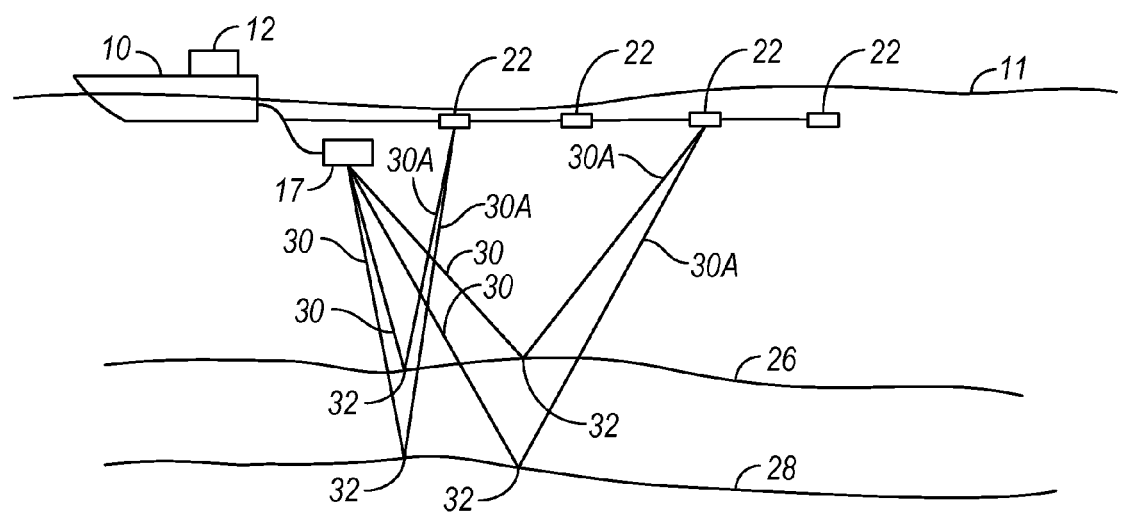
FIG. 2 shows a vertical section corresponding to the plan view of FIG. 1.

The example of seismic data acquisition shown in FIG. 1 is shown partially in cross section in FIG. 2 to illustrate the basis of a geometric definition used in the description of the present invention. When the seismic energy source 17 (only one shown in FIG. 2) is actuated, seismic energy propagates outwardly from the source 17, some of which moves downwardly through the subsurface to acoustic impedance boundaries 26, 28 located in rock formations below the water bottom. Such energy is shown generally by ray paths at 30. When seismic energy is reflected from the boundaries 26, 28, it travels upwardly until it is detected by the sensors 22. Such upwardly traveling energy is shown generally along ray paths 30A. At each position at which the source 17 is actuated, and for each corresponding seismic sensor position, there is a position in the subsurface, these positions shown generally at 32, which may be considered a reflection point. Each reflection point 32 will typically be located at one half the distance (offset) between the source 17 and the particular seismic sensor 22 at the time of source actuation and recording of the detected signals. Thus, a set of reflection points may be defined based on the positions of the source 17 and the sensors 22 for each actuation of the source 17. The cross section shown in FIG. 2 includes only one streamer and one seismic energy source for clarity of the illustration, however the principle is applicable to any number of seismic energy sources and seismic sensors.

A result of the acquisition arrangement shown in FIG. 2 is that for each actuation of the seismic energy source, a plurality of seismic signal recordings is generated. Each such signal recording may include reflective events that correspond to the series of acoustic impedance boundaries at the midpoint between the position of the seismic source and the position of the sensor at the time of actuation of the seismic source. Thus, for a single actuation of the source, a plurality of signal recordings is generated, with each recording corresponding to boundaries at the midpoint between the source and the sensor. As will be appreciated by those skilled in the art, as the vessel moves along the water and the source is repeatedly actuated, successive signal recordings will be made that correspond to essentially the same midpoint as in prior recordings, the difference between successive recordings being the distance ("offset") between the seismic source and the sensor. In a typically seismic survey, therefore, a plurality of different offset signal recordings correspond to the same position in the survey area. If a system such as the one shown in FIG. 1 is used, such offsets may be defined both along the direction of motion of the survey vessel and perpendicular to the direction of motion. A set of survey positions may be defined based on the approximate position of the mid points determined as shown in FIG. 2. The survey area is usually defined by a grid of rectangular "bins". For each such bin, a set of data "midpoints" may be defined based on offset.

As explained above in the Background section herein, in seismic survey acquisition techniques known in the art, it is believed that good survey results are obtained by operating the vessel and the streamers such that the reflection points 32 are as uniformly spaced as practicable, and that inadequate imaging or "coverage" of features in the subsurface may result if the spatial density of the reflection points is irregular or below a selected threshold. Using the above explanation of bins, prior art techniques provided that a selected number of data traces were required to be assigned to each bin associated with a particular survey position. Using prior art data quality evaluation techniques, it was believed that absence of sufficient numbers of traces in certain bins was justification for infill shooting.

Each seismic data "trace" ("trace" being the term known in the art for a graphic or other representation of a recorded or interpreted seismic signal) that is input to prestack migration techniques for seismic interpretation, however, contributes to a plurality of output traces from the migration procedure. In migration, the output traces are caused to correspond to selected survey positions such as those defined above with reference to FIG. 2. Because of such contribution to multiple output traces of each input trace, it has been determined that sufficiency of data coverage may not necessarily require sufficient numbers of traces corresponding to each of a plurality of predefined bins.

Figure 3:
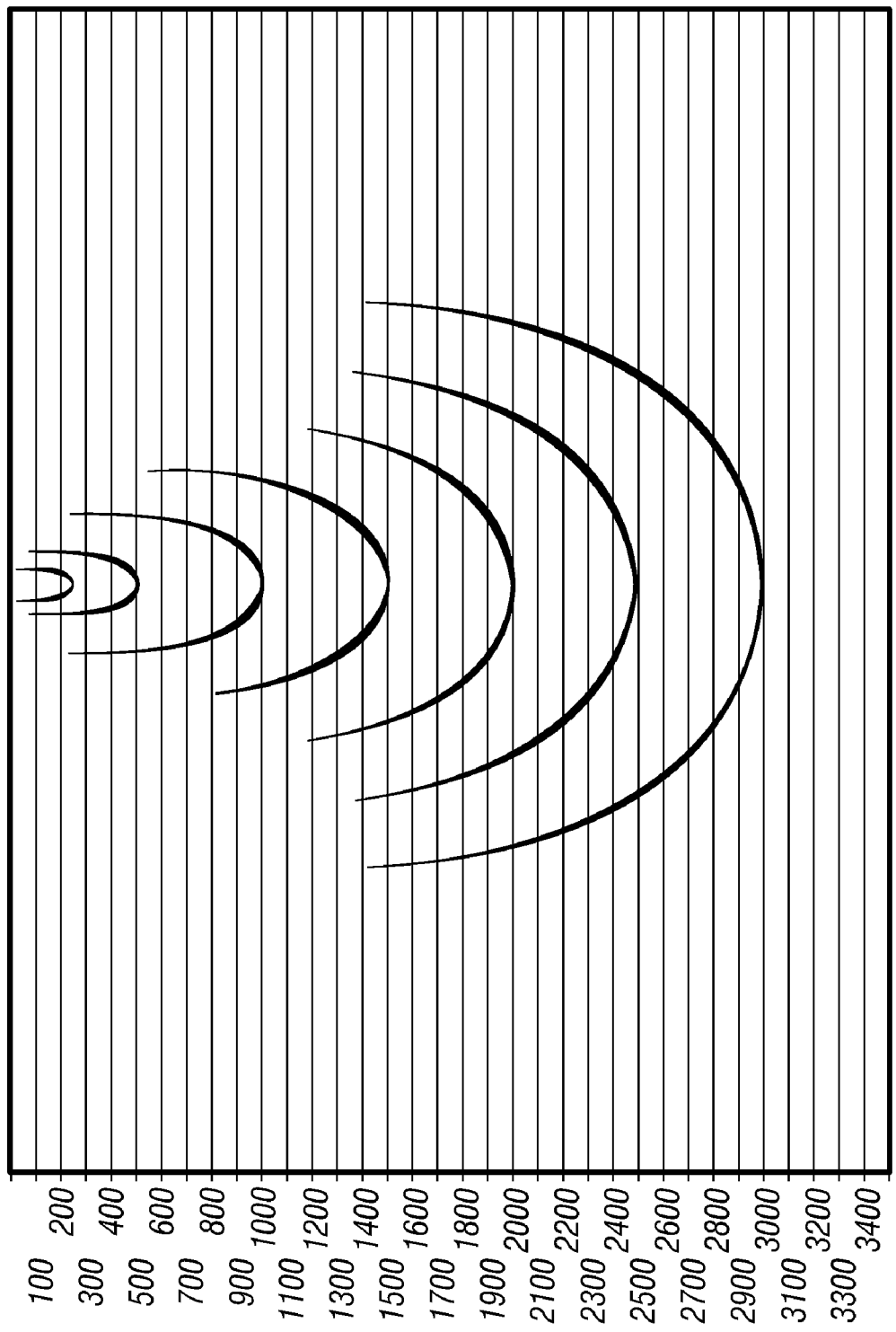
FIG. 3 shows examples of trace impulse response for migration for various flat reflectors in the subsurface.

An explanation of methods according to the invention begins with reference to FIG. 3, which shows a typical 2D migration impulse response. Such response is shown in the form of possible reflector positions in the subsurface. Note that the impulse response is wider at longer travel times through the subsurface. At the base of each impulse response, a single trace contributes energy to several adjacent traces, and when a plurality of traces is summed in the output from migration an improved image will result. The traces which contribute to the image of a substantially flat reflective event (i.e., the base of the migration response) fall in an area that can be defined mathematically as the Fresnel zone. If the Fresnel zone is relatively large, there is little difference between the contribution to a migration output of a trace which is disposed exactly in the center of the Fresnel zone, and a trace which is slightly offset from the center. In methods according to the invention, the size of the Fresnel zone can be the basis for assessment of the sufficiency of coverage of seismic data.

FIG. 4A shows an explanation of the expected size of the Fresnel zone depending on the frequency of the seismic energy detected from a particular subsurface reflector, the seismic velocity and the two-way travel time of the seismic energy to the particular reflective horizon in the subsurface. In FIG. 4A, the Fresnel zone radius, $R_f$, is given by:

$$R_f = \frac{AA'}{2}\left[\left(L+\frac{\lambda}{4}\right)-L^2\right]^{1/2} \approx \frac{v}{2}\left(\frac{t}{F}\right)^{1/2} \quad (1)$$

where L is depth, F is frequency, v is velocity, λ is wavelength, and t is two-way vertical travel time to depth L. Equation (1) may be used for the case of a seismic source and seismic receiver being collocated to estimate the size of the Fresnel zone for each reflective horizon in each trace acquired during a seismic survey. It should be emphasized that FIG. 4A only illustrates the Fresnel zone for a situation where the source and receiver are collocated on the surface. While it is common practice for this to be used as a definition of the Fresnel zone, it is possible to compute Fresnel zone shapes and sizes for the more common situation where the source and receiver are not located at the same point (they are offset), as shown, for example, in FIG. 4B, and these Fresnel zones are larger and elliptical. In FIG. 4B, z is the depth to the horizon and $Z_1$ and $Z_2$ are the up-going and down-going ray paths, respectively, for a ray that is at the limit of the Fresnel zone radius where the shot and receiver are not coincident. It is important in practical implementations of the present invention that offset Fresnel zones are used. One equation that defines the shape of such Fresnel zone is as follows:

$$\frac{x^2}{L_1^2 - z^2 - h^2} + \frac{y^2}{L_1^2 - \left(\frac{L_1^2 z^2}{L_1^2 - h^2}\right)} = 1 \quad (2)$$

wherein
x=radius of ellipse in the direction perpendicular to shot receiver azimuth.
y=radius of ellipse in the direction parallel to shot receiver azimuth.
h=half the receiver offset (source to receiver distance=offset/2)
z=depth to the horizon.
$L_1=0.5(2L+\Delta L)$
L=one way ray path distance ($=\sqrt{h^2+z^2}$)
ΔL=half wavelength=v/(2f)
v=velocity
f=frequency Once the Fresnel zone size has been determined, a weight function may be defined based on the distance from the position corresponding to the particular recorded data trace used. The weight function may be set to unity or other convenient value at the position of the data trace (the center of the Fresnel zone) and may decrease to zero at the outer limit of the Fresnel zone. The Fresnel zone for each input data trace for each reflective horizon may be overlaid on a grid of the output bin locations. A weighted trace amplitude value may be defined for each trace for each bin based on the distance between the center of each bin and the center of the Fresnel zone for each data trace. For each bin, the weighted trace amplitudes are summed for all traces whose bin centers are within Fresnel zones of each data trace for each such reflective horizon. For each bin having a summed weighted trace amplitude exceeding a selected threshold, such bin may be deemed to have sufficiently dense seismic data coverage to avoid spatial aliasing in an output image trace corresponding to that particular bin. It should be noted that while a Fresnel zone may be calculated for each of the seismic traces actually recorded, the method of the invention may also be used by computing Fresnel zones for only a subset of the seismic data traces. Fresnel zone may be interpolated for the traces not used to compute a Fresnel zone.

In some examples, the weighted trace amplitude for each bin may be determined during seismic acquisition operations, such as explained above with reference to FIG. 1. In such examples, the weighted trace amplitude values may be stored or displayed in one or more devices forming part of the recording system (12 in FIG. 1), so that an evaluation of whether and to what extent infill seismic acquisition may be required for adequate data coverage can be made.

The thresholds selected for the assessment of coverage based on Fresnel zones will be related to the amplitude of the final image (that is, the image made by migration) of the seismic data at any particular image output or bin center location. The foregoing is not true of current methods of seismic coverage assessment where a completely empty bin (no traces), deemed to represent inadequate coverage, may still have a seismic image after migration.

Figures 5D, 5E, 6A, 6B:
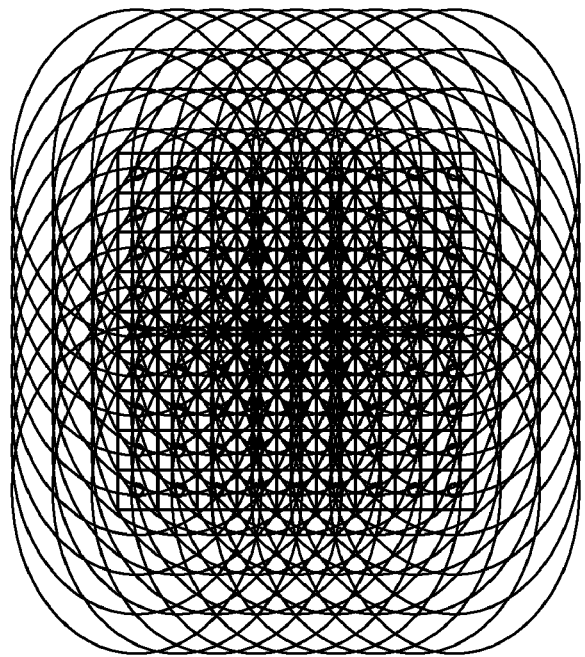

FIGS. 5A through 5E show a set of migration image output bins each associated with a bin center at a predefined position. In techniques for determining sufficiency of data density known in the art prior to the present invention, as explained above, a certain number of input data traces (one or more, depending on bin size and other factors) was required to be associated with each bin in order for the seismic data to be deemed sufficiently dense to properly image features in the subsurface without spatial aliasing. FIG. 5A shows one such output bin approximately in the center of a grid of such bins, typically equal in size and uniformly spaced. An example Fresnel zone for a data trace allocable to the bin is shown by the ellipse in FIG. 5A. In FIG. 5B, a weight for the trace of FIG. 5A is shown as unity for the situation where the geodetic position of the mid point of the source and receiver positions at the time of signal recording is located within the indicated bin. For such situation, the bin including the mid point position is assigned a weight of unity or 100 percent, and other bins are assigned a weight of zero. FIG. 5C shows the bin weight of FIG. 5B for the example trace with an overlay of bin weights calculated according to an example of the invention. The bin weights in FIG. 5C correspond to the Fresnel zone outline shown in FIG. 5A. FIGS. 5D and 5E show bin allocation according to methods known in the art prior to the present invention. For bins in which no data trace has a mid point within the geodetic area defined by the bin, no weight is applied, and as shown in FIG. 5D no trace is allocated to such bin. In determining scope of coverage using the binning shown in FIG. 5D, weight functions shown in FIG. 5E indicate zero weight to the bins having no allocated trace.

FIGS. 6A and 6B illustrate weight function calculation according to an example of the invention. For a seismic system as shown in FIG. 1, each trace may have a Fresnel zone calculated as explained above with reference to FIGS. 4A and 4B. Such Fresnel zones for an example horizon are shown in FIG. 6A superimposed on a bin grid similar to the one shown in FIGS. 5A through 5E. Weight functions calculated as explained above provide trace amplitude values as shown in FIG. 6B. As can be observed in FIG. 6B, notwithstanding "holes" in the coverage if bin allocation is performed according to prior art methods, the trace amplitude sum value for essentially all bins in FIG. 6B indicate substantial trace amplitude sum values. Accordingly, data coverage may be determined to be adequate using a method according to the invention.

It is well known in the art that imaging of shallow layers or horizons in the subsurface uses seismic traces which have smaller offsets (distance between source position and receiver position), whereas longer offset seismic data is useful for imaging deeper layers in the subsurface. Furthermore, the seismic reflections from shallow depths in the subsurface occur at an earlier time in a seismic record. The size of the Fresnel zone is a function of both seismic travel time and offset, and is smaller at shorter time and smaller offset. For imaging of very shallow targets, only the shortest offset seismic data at very early time are useful. The Fresnel zone associated with these images is therefore relatively small. However, as the offset increases, the size of the Fresnel zone increases.

As a result of the foregoing analysis of Fresnel zones, and referring once again to FIG. 1, it has been determined that it is possible to obtain adequate coverage of seismic data using a streamer array geometry that is intentionally "feathered", preferably symmetrically about the centerline of the survey vessel 10, that is, having the lateral spacing between streamers increase with respect to the distance between the seismic energy source 17 and each seismic sensor 22 (offset) up to a maximum lateral distance associated with sufficient or predetermined density of data coverage. In a method according to one aspect of the invention, a size of the Fresnel zone associated with each seismic sensor is determined as explained above. A maximum lateral distance between longitudinally corresponding seismic sensors on adjacent streamers is then determined that will result in sufficient or predetermined density seismic data coverage. Such sufficiency or predetermined density, as explained above may be determined when a sum of contributions of each trace to each output location bin exceeds a selected threshold. The sum corresponding to each bin may be stored in a computer readable medium or may be displayed on a computer display.

In one example, the recording system 12 may be configured to cause the LFD devices 26 to operate to laterally deflect the streamers 20 until measurements from the ARDs 23, 26A indicate that the streamers attain lateral distance between them that is determined as explained above. It will be appreciated by those skilled in the art that while the lateral spacing or distance between streamers may generally increase with respect to offset, it is within the scope of the present invention for the relationship between the lateral spacing and the offset to be other than monotonic. For example, the distance may remain constant for a selected offset range, and then increase with respect to offset. Such increase may be linear or non-linear, and may revert to constant spacing at a selected further offset distance along the streamers.

Figure 1A:
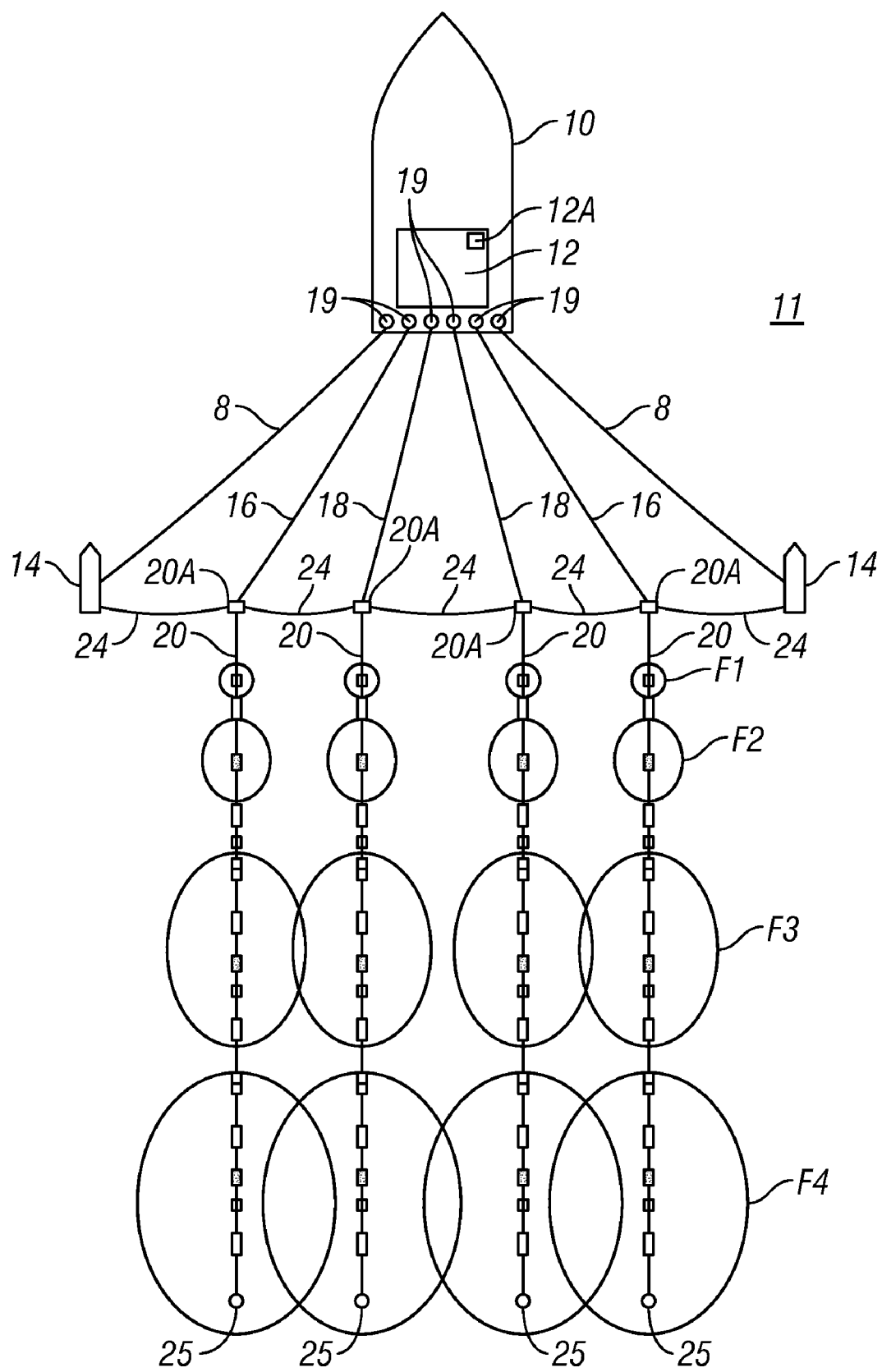
FIG. 1A shows a set of Fresnel zones which may be computed for different traces in the configuration shown in FIG. 1.

Referring to FIG. 1A, Fresnel zones for selected sensor positions are shown at F1, F2, F3 and F4. As can be inferred from the explanation above, the size of the Fresnel zones corresponding to larger offsets will be larger at larger offset. Taken as an approximation of the coverage represented by a seismic data record from the respective sensor positions shown in FIG. 1A, the Fresnel zones corresponding to the larger offsets shown (F3 and F4) have considerable lateral overlap. This suggests that the uniform lateral spacing may provide more coverage than is required to accurately image the subsurface at such offsets.

Figure 1B:
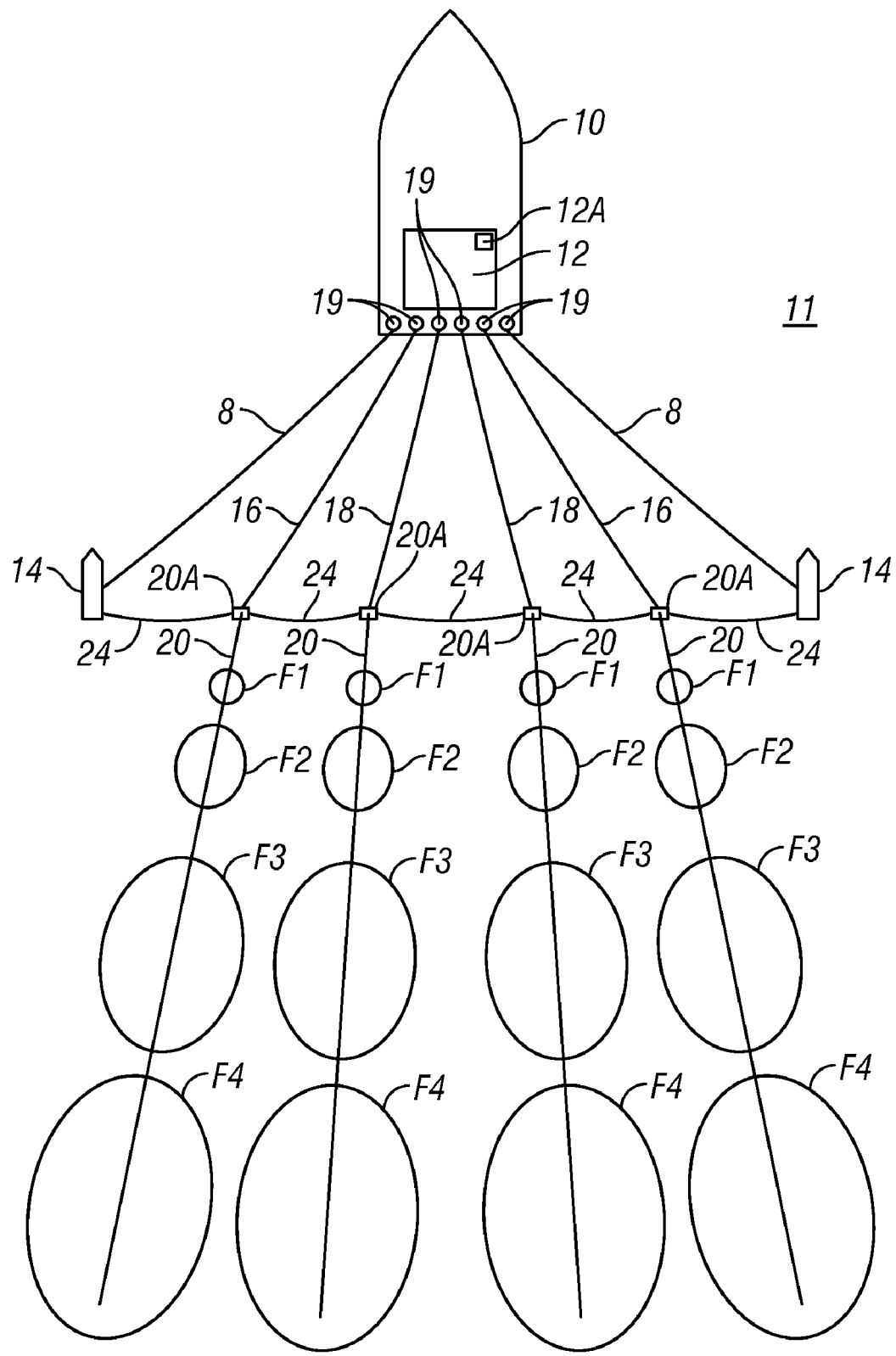
FIG. 1B shows how the streamers may be positioned so as to better accommodate the Fresnel zones shown in FIG. 1A

In FIG. 1B, the same Fresnel zones at the same offsets are shown wherein the streamers are configured as explained above. That is, the streamers are steered so that their lateral spacing is related to offset, generally increasing as offset increases. In such configuration, the Fresnel zones at F3 and F4 do not overlap, suggesting sufficient but not more than necessary seismic data coverage of the subsurface.

Figure 7:
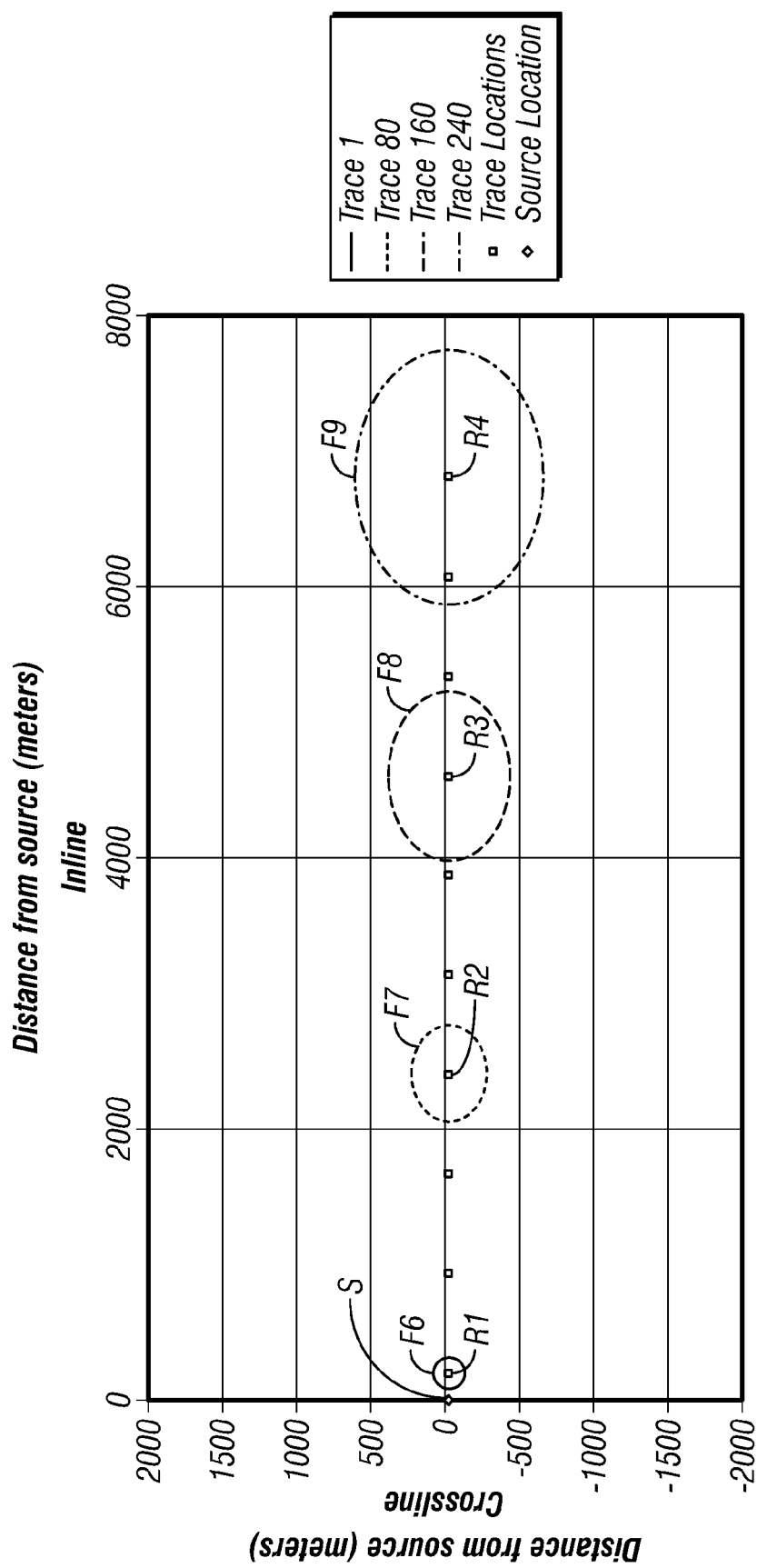
FIG. 7 shows an illustration of calculation of Fresnel zones

An illustration of calculation of Fresnel zones is shown in FIG. 7. The seismic source position is shown at S. Sensors for which the Fresnel zones are to be calculated are shown at R1, R2, R3 and R4. The corresponding Fresnel zones are shown at F6, F7, F8 and F9, respectively.

Offsets for each of the seismic sensors in the calculation shown in FIG. 7 are 205 meters for sensor R1, 2405 meters for sensor R2, 4605 meters for sensor R3 and 6805 meters for sensor R4. The foregoing is representative of actual streamers of 6600 meter length. The subsurface reflector (target) depth for each offset evaluated is 500 meters for the signal detected at sensor R1, and 3100 meters, 4150 meters and 5900 meters for the signals at R2, R3 and R4, respectively. The foregoing represent seismic travel times of 534 milliseconds, 1.716 sec, 2.550 sec and 3.555 sec., respectively The Fresnel zones have been computed based on a gradient velocity of 1700 meters per second+0.7 meters per second per meter. The Fresnel zones F6, F7, F8 and F9 are shown by their limits in the ellipses in FIG. 7. The increase in size with respect to offset is clearly shown.

Methods according to the invention may provide more efficient seismic survey operations than is possible using seismic survey techniques known in the art prior to the present invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:
1. A method for marine seismic surveying, comprising:
towing a plurality of seismic sensors disposed on a plurality of seismic streamers in a body of water;
actuating a seismic energy source in the body of water at selected times;

detecting seismic signals at the seismic sensors resulting from the actuation of the seismic energy source;

creating a seismic data trace for each of the detected signals;

determining at least one Fresnel zone for at least some of the seismic data traces;

computing a contribution of each of the seismic data traces to each one of a plurality of bins defined in a predetermined pattern, each contribution based on the Fresnel zone associated with each seismic data trace;

based on the computed contributions, determining a maximum lateral distance between longitudinally corresponding seismic sensors on each streamer that will result in a contribution sum in each bin exceeding a selected threshold; and at least one of storing and displaying the maximum lateral distance.

2. The method of claim 1 wherein the contribution for each bin is determined by calculating a distance between (i) a position of a midpoint between a seismic source location and a seismic receiver location corresponding to each seismic data trace and (ii) a center of each bin.

3. The method of claim 2 further comprising applying a predetermined function to each seismic data trace, the function defining a relationship between the calculated distance and a scaling factor.

4. The method of claim 3 wherein the predetermined function has a maximum value at the midpoint determined for each seismic data trace and the predetermined function has a value of zero at an edge of the Fresnel zone corresponding to each seismic data trace.

5. The method of claim 1 wherein a geometry of each Fresnel zone is related to a velocity distribution of subsurface formations and a seismic energy frequency.

6. The method of claim 5 wherein the seismic energy frequency is related to a seismic travel time to a selected subsurface horizon.

7. The method of claim 1 wherein a seismic vessel performs the towing of the seismic sensors, and further comprising steering the seismic vessel as closely as possible to a predetermined seismic survey path, without modification of vessel trajectory to compensate for streamer feathering.

8. The method of claim 1 further comprising determining a plurality of Fresnel zones for each seismic data trace, each of the plurality of Fresnel zones for each trace having geometry related to a seismic energy travel time of seismic energy to a selected horizon and a frequency of seismic energy corresponding to seismic signals related to the selected horizon.

9. The method of claim 1 further comprising operating at least one steering device on at least one streamer to cause a lateral distance between adjacent streamers to correspond to the determined maximum lateral distance between streamers.

10. The method of claim 1 further comprising repeating the determining the maximum lateral distance for all longitudinally corresponding sensors on each of the streamers.

11. The method of claim 10 further comprising operating at least one steering device on each streamer to cause lateral distances between adjacent streamers to correspond to the determined maximum lateral distances between streamers.

12. The method of claim 1 further comprising interpolating a Fresnel zone for the ones of the seismic traces for which no Fresnel zone has been determined.

* * * * *